United States Patent
Uchiyama et al.

(10) Patent No.: US 8,422,127 B2
(45) Date of Patent: Apr. 16, 2013

(54) MICROSCOPIC IMAGE CAPTURING DEVICE

(75) Inventors: Shigeru Uchiyama, Hamamatsu (JP); Takayuki Inoue, Hamamatsu (JP); Masatoshi Okugawa, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 936 days.

(21) Appl. No.: 11/886,255

(22) PCT Filed: Mar. 17, 2006

(86) PCT No.: PCT/JP2006/305434
§ 371 (c)(1),
(2), (4) Date: Apr. 30, 2008

(87) PCT Pub. No.: WO2006/098443
PCT Pub. Date: Sep. 21, 2006

(65) Prior Publication Data
US 2009/0002811 A1  Jan. 1, 2009

(30) Foreign Application Priority Data
Mar. 17, 2005  (JP) .................. P2005-077990

(51) Int. Cl.
*G02B 21/00* (2006.01)
(52) U.S. Cl.
USPC .............................................. 359/383
(58) Field of Classification Search ............. 359/814, 359/824, 383; 369/44.14–44.21
See application file for complete search history.

(56) References Cited

U.S. PATENT DOCUMENTS

| | | | |
|---|---|---|---|
| 3,826,558 A * | 7/1974 | Rasberry et al. | 359/393 |
| 5,337,178 A * | 8/1994 | Kung et al. | 359/393 |
| 2002/0131167 A1 | 9/2002 | Nguyen et al. | |
| 2002/0154396 A1 * | 10/2002 | Overbeck | 359/368 |
| 2003/0184855 A1 * | 10/2003 | Yasuda et al. | 359/383 |
| 2004/0256538 A1 | 12/2004 | Olson et al. | |

FOREIGN PATENT DOCUMENTS

| | | |
|---|---|---|
| JP | 02-295042 | 12/1990 |
| JP | 4-110960 | 9/1992 |
| JP | 06-309035 A | 11/1994 |
| JP | 7-056093 | 3/1995 |
| JP | 7-174980 | 7/1995 |
| JP | 8-021961 | 1/1996 |
| JP | 9-304703 | 11/1997 |
| JP | 11-264937 A | 9/1999 |
| JP | 2000-241713 | 9/2000 |
| JP | 2002-228421 | 8/2002 |
| JP | 2002-365234 A | 12/2002 |
| JP | 2003-005079 | 1/2003 |

\* cited by examiner

*Primary Examiner* — Stephone B. Allen
*Assistant Examiner* — Tamara Y Washington
(74) *Attorney, Agent, or Firm* — Drinker Biddle & Reath LLP

(57) ABSTRACT

The present invention relates to a microscopic image capturing apparatus having a structure that, in scanning an imageable area of an imaging unit in a predetermined direction in an imaging object area, in which a sample is present, can reliably set a focal point of the imaging unit on each imaging position set inside the imaging object area regardless of the type of focusing actuator. The microscopic image capturing apparatus has a sample setting stage having a sample setting surface that is inclined with respect to a scan plane orthogonal to an optical axis of an objective lens. By moving the sample setting stage along the scan plane such that the distance in the optical axis direction between the imaging unit and the sample setting surface varies monotonously, the focal point position of the imaging unit is adjusted in only one direction along the optical axis of the objective lens.

8 Claims, 12 Drawing Sheets

MICROSCOPIC IMAGE CAPTURING DEVICE

TECHNICAL FIELD

The present invention relates to a microscopic image capturing apparatus that, while scanning a surface of a sample, set on a sample setting stage, in a predetermined direction, successively captures localized microscopic images of the sample surface.

BACKGROUND ART

A microscopic image capturing apparatus, having a sample setting stage that is movable along a plane (scan plane) orthogonal to an optical axis of an objective lens, has been known from before. Such a microscopic image capturing apparatus successively captures localized microscopic images of a sample surface while moving the sample setting stage, on which the sample is set, along the scan plane. In this process, a focal point of an imaging unit is finely adjusted to be successively set on desired imaging positions on the sample surface in accordance with the movement of the sample setting stage.

As an example of a focusing apparatus applicable to the microscopic image capturing apparatus with the above-described structure, there is known a focusing apparatus described in Patent Document 1. The focusing apparatus described in Patent Document 1 determines numerical formula information of a virtual plane, corresponding to a sample surface, in advance from coordinate information on three arbitrary points X, Y, and Z on the sample surface, determines Z-coordinate information of an observation point, with which an inclination component of the sample surface is corrected, based on the numerical formula information, and drives an objective lens in a Z-axis direction to set a focal point on the observation point, based on the Z-coordinate information.

Patent Document 1: Japanese Patent Application Laid-Open No. H9-304703

DISCLOSURE OF THE INVENTION

Problems that the Invention is to Solve

The inventors have studied the conventional microscopic image capturing apparatus in detail, and as a result, have found problems as follows. Namely, when, for example, in the conventional microscopic image capturing apparatus, such as described in Patent Document 1, a stepping motor, an so on, is employed as a focusing apparatus that drives an objective lens in Z-axis directions (directions along an optical axis of the objective lens), the following issue arises.

In other words, in an objective lens drive system arranged from a stepping motor, lost motion occurs due to errors in forward and reverse rotation of the motor, gear backlash, torsional rigidity of a ball screw mechanism, and so on. Thus, when the objective lens is driven in one direction (toward a positive side) along the Z-axis and then driven in an opposite direction (toward a negative side) immediately thereafter or is driven toward the negative side and then driven toward the positive side immediately thereafter, the objective lens becomes unable to be kept track of in real time and a focal point of a CCD camera or other imaging unit cannot be set reliably at each imaging position set inside an imaging object area.

The present invention is made to solve the aforementioned problem, and it is an object to provide a microscopic image capturing apparatus having a structure that, in scanning an imageable area of an imaging unit in a predetermined direction within an imaging object area in which a sample is present, can reliably set a focal point of the imaging unit on each imaging position set inside the imaging object area regardless of the type of focusing actuator.

Means for Solving the Problems

A microscopic image capturing apparatus according to the present invention is a microscopic image capturing apparatus that successively captures localized microscopic images of a sample surface while scanning an imageable area of an imaging unit in a predetermined direction, and comprises a sample setting stage, an imaging unit of a CCD camera, and so on, an objective lens, a first driving mechanism, a second driving mechanism, and a control unit. The sample setting stage has a sample setting surface on which a microscopic observation sample can be set. The imaging unit is arranged so as to oppose the sample setting surface and successively captures a portion of the sample that is present inside an imageable area (a region that can be captured at once by the imaging unit) within an imaging object area on the sample setting surface. The objective lens is arranged between the imaging unit and the sample setting surface and forms, on the imaging unit, an image of the imageable area (a localized microscopic image of the sample that is the object of imaging by the imaging unit) within the imaging object area. The first driving mechanism moves at least one of either the sample setting stage or the objective lens along a scan plane that is orthogonal to an optical axis of the objective lens. The first driving mechanism thereby adjusts the relative positions of the sample setting stage and the objective lens. The second driving mechanism moves at least one of the sample setting stage and the objective lens along an optical axis direction of the objective lens. The second driving mechanism thereby adjusts the relative positions of the sample setting stage and the objective lens. The control unit, by controlling the first and second driving mechanisms, moves the imageable area of the imaging unit in a relative manner along a predetermined scan direction while adjusting the focal point position of the imaging unit in the imaging object area.

Particularly, in the microscopic image capturing apparatus according to the present invention, the sample setting surface of the sample setting stage is inclined with respect to the scan plane. More specifically, the sample setting surface of the sample setting stage is inclined to a degree such that a straight line on the sample setting surface that intersects the optical axis of the objective lens intersects the scan plane at a predetermined angle.

As described above, the microscopic image capturing apparatus according to the present invention is constituted so that as the sample setting stage and the objective lens move in a relative manner in the predetermined scan direction, the imageable area of the imaging unit moves in the predetermined scan direction with respect to the imaging object area. In this process, the control unit controls the first driving mechanism so that, while the imageable area of the imaging unit moves relatively in the predetermined scan direction within the imaging object area, the focal point position of the imaging unit is monotonously adjusted in only one direction along the optical axis of the objective lens. This "monotonous adjustment of the focal point position" includes a state in which the focal point position is kept fixed. The direction of fine adjustment of the objective lens onto the focal point position of the imaging unit is thus either a negative direction, with which the focal point position is made shallower with respect to the sample surface, or a positive direction, with which the focal point position is made deeper with respect to the sample surface.

Also, preferably in the microscopic image capturing apparatus according to the present invention, the sample setting surface of the sample setting stage has an inclination such that when a slide glass on which a sample, such as a piece of tissue, is positioned is set on the sample setting surface, a surface of the slide glass that opposes the imaging unit across the objective lens is inclined with respect to the scan plane. The sample that is set on the sample setting surface is not fixed in volume or shape, and the inclination of the surface of the cover glass that covers the tissue piece may not depend on the inclination of the sample setting surface. In this case, the direction in which the focal point position of the imaging unit is finely adjusted may not stabilize in just one direction. Thus, as the inclination angle θ of the sample setting surface with respect to the scan plane, at least an angle by which the surface of the sample on the sample setting surface matches the direction of inclination of the sample setting surface is necessary (the inclination angles do not have to be matched necessarily).

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

EFFECTS OF THE INVENTION

In accordance with the microscopic image capturing apparatus according to the present invention, the focal length of the imaging unit varies monotonously according to the inclination of the sample setting surface (this monotonous variation also includes the state where the focal length of the imaging unit is maintained) while the imageable area of the imaging unit moves in the predetermined scan direction within the imaging object area. As a result, the direction of fine adjustment of the position of the objective lens along the optical axis of the objective lens is restricted to just a fixed direction.

In the microscopic image capturing apparatus according to the present invention, due to having the above arrangement, even when a stepping motor is applied as an actuator for focusing, the occurrence of lost motion in a driving system based on the stepping motor is suppressed effectively, and the focal point of the imaging unit can be set accurately at each imaging position set inside the imaging object area (clear localized microscopic images of specific portions of a sample surface can be obtained).

Also, in accordance with the microscopic image capturing apparatus according to the present invention, the inclination of the sample setting surface of the sample setting stage is such that, when a sample is set on the sample setting surface, the surface of the sample that opposes the imaging unit across the objective lens is inclined with respect to the scan plane. In this case, the direction in which the objective lens is finely adjusted along the optical axis of the objective lens can be restricted to just a fixed direction regardless of the volume or shape of the sample.

In the microscopic image capturing apparatus according to the present invention, due to having the above arrangement, even when a stepping motor is applied as an actuator for focusing, the occurrence of lost motion in a driving system based on the stepping motor is prevented reliably, and the focal point of the imaging unit can be set accurately at each imaging position set inside the imaging object area (clear localized microscopic images of specific portions of a sample surface can be obtained).

DESCRIPTION OF THE REFERENCE NUMERALS

1 . . . slide glass housing unit (cassette holder); 2 . . . slide glass conveying unit; 3 . . . slide glass setting unit; 31 . . . base stage; 32 . . . stepping stage; 33 . . . scanning stage; 33A . . . sample setting surface; 38 . . . stage XY-axis driving mechanism (first driving mechanism); 4 . . . slide glass imaging unit; 41 . . . scan light source; 42 . . . optical system; 43 . . . CCD camera (imaging unit); 44 . . . focusing Z-axis driving mechanism (second driving mechanism); 45 . . . control apparatus; and SG . . . slide glass.

BEST MODES FOR CARRYING OUT THE INVENTION

In the following, embodiments of a microscopic image capturing apparatus according to the present invention will be explained in detail with reference to FIGS. 1 to 12. In the explanation of the drawings, constituents identical to each other will be referred to with numerals identical to each other without repeating their overlapping descriptions. Also, in the following description, it shall be deemed that an upper portion and a lower portion of each drawing respectively correspond to an upper portion and a lower portion of the apparatus.

Figure 1:
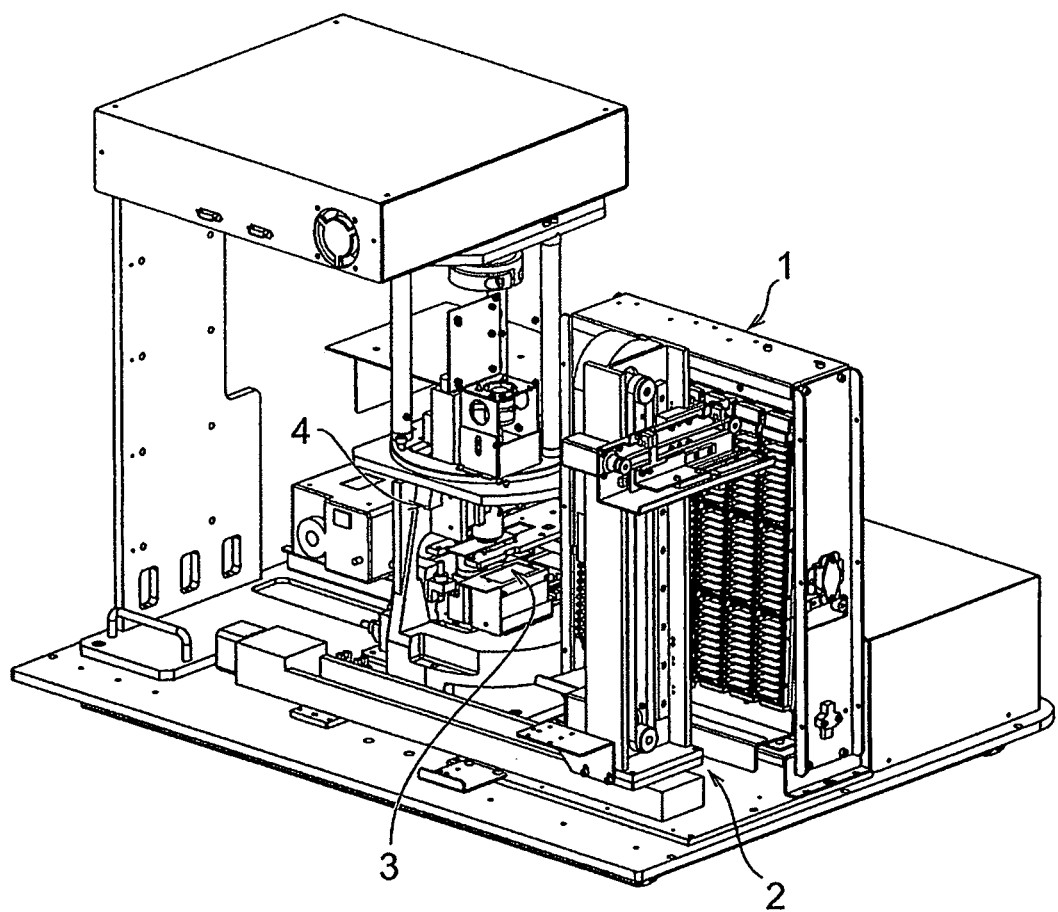
FIG. 1 is a perspective view of a general arrangement of an embodiment of a microscopic image capturing apparatus according to the present invention.

FIG. 1 is a perspective view of a general arrangement of an embodiment of a microscopic image capturing apparatus according to the present invention.

The microscopic image capturing apparatus shown in FIG. 1 captures a microscopic image of a slide glass (prepared slide) in which a sample, such as a tissue piece of a pathological tissue sample, is sealed. This microscopic image capturing apparatus has at least a slide glass housing unit 1, which houses a plurality of slide glasses, each having a sample sealed therein, a slide glass conveying unit 2, which takes out and successively conveys slide glasses one at a time from the slide glass housing unit 1, a slide glass setting unit 3, on which the slide glass conveyed by the slide glass conveying unit 2 is set and which moves the slide glass in a predetermined direction, and a slide glass imaging unit 4, which captures microscopic images of the sample on the slide glass setting unit 3.

Figure 2:
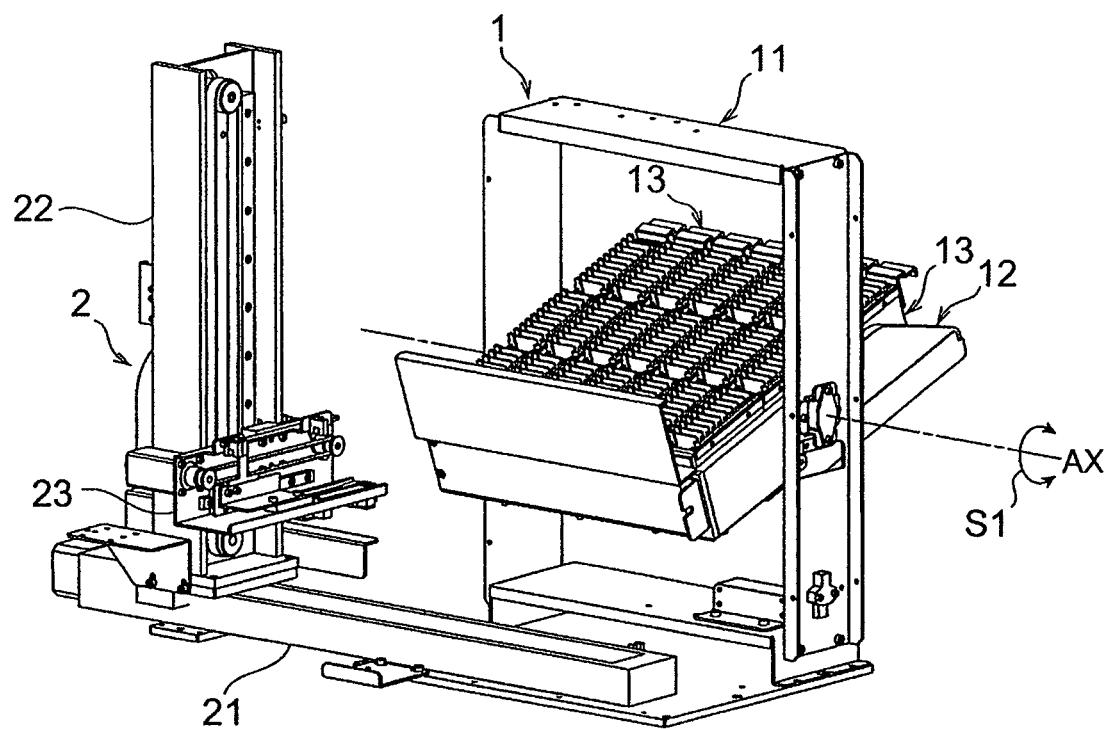
FIG. 2 is a perspective view of an arrangement of a slide glass housing unit (including a cassette holder) shown in FIG. 1, and shows a state in which a holder portion of the cassette holder is inclined.
Figure 3:
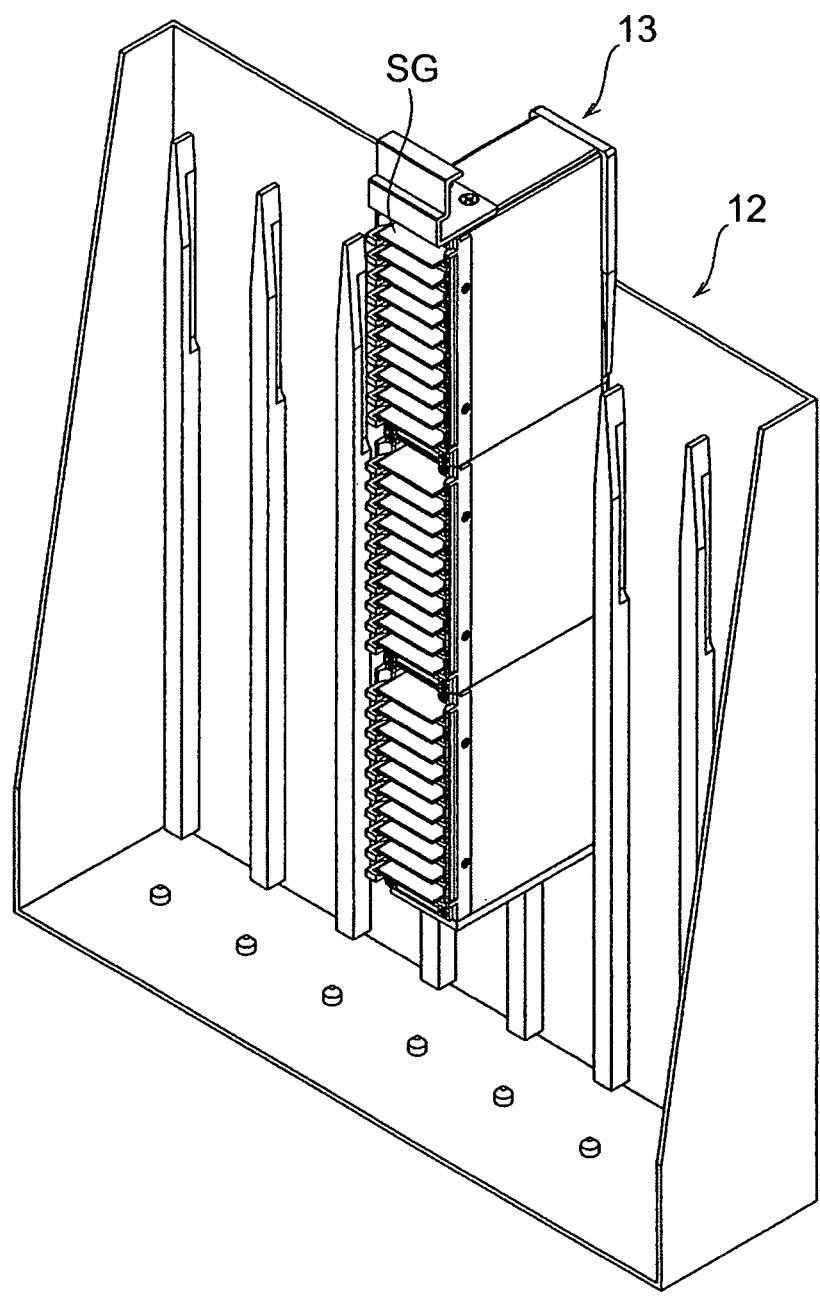
FIG. 3 is a perspective view for describing a process of installing a slide glass cassette in a cassette portion shown in FIG. 2.

The slide glass housing unit 1, as shown in FIG. 2, has a supporting frame 11, a holder portion 12, and slide glass cassettes 13. A cassette holder is arranged from at least the supporting frame 11 and the holder portion 12. The holder portion 12 is held by the supporting frame 11 in a manner enabling rotation in directions indicated by the arrows S1 about a horizontal axis AX, and the supporting frame 11 holds the holder portion 12 at an orientation (first orientation), in which the slide glass cassettes 13 are inclined so that takeout exits for the slide glasses face upward as shown in FIG. 2, and an orientation (second orientation), in which the slide glass cassettes 13 are set upright so that the takeout exits for the slide glasses are positioned vertically. Between the first and second orientations, the holder portion 12 rotates at a fixed rotation speed about the horizontal axis AX. In each slide glass cassette 13 having a vertically long, box-like shape, as shown in FIG. 3, a plurality of slide glasses SG are layered in a state enabling takeout from an opening at the front side.

Figure 4:
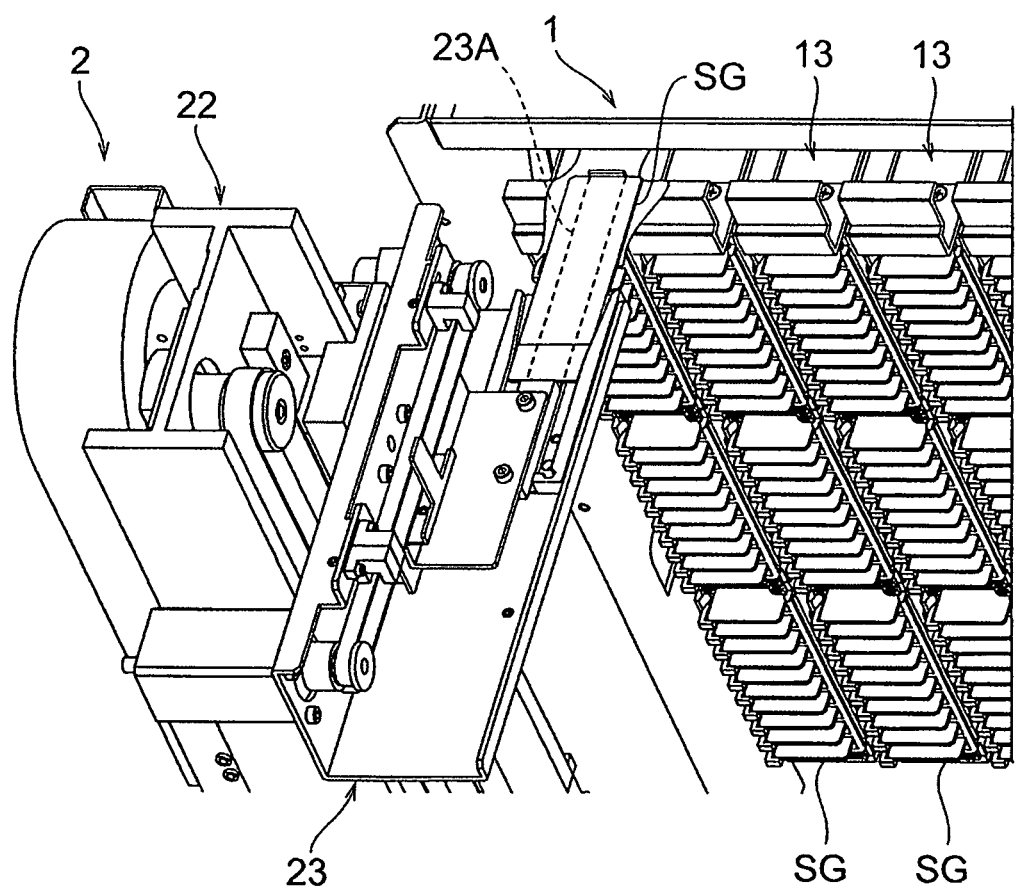
FIG. 4 is a partial perspective view of an arrangement of an X-axis stage of a slide glass conveying unit shown in FIG. 2.

As shown in FIG. 2, the slide glass conveying unit 2 is disposed in front of the slide glass housing unit 1, and has a Y-axis stage 21, which extends in left and right Y-axis directions, a Z-axis stage 22, which is position controlled in the left and right Y-axis directions by the Y-axis stage 21, and an X-axis stage, which is position controlled in upper and lower Z-axis directions by the Z-axis stage 22. The X-axis stage 23, as shown in FIG. 4, is provided with a draw-out handle 23A that is driven to proceed and retract in front and rear X-axis directions to draw out the slide glasses SG, housed in the respective slide glass cassettes 13 of the slide glass housing unit 1, one at a time.

Figure 5:
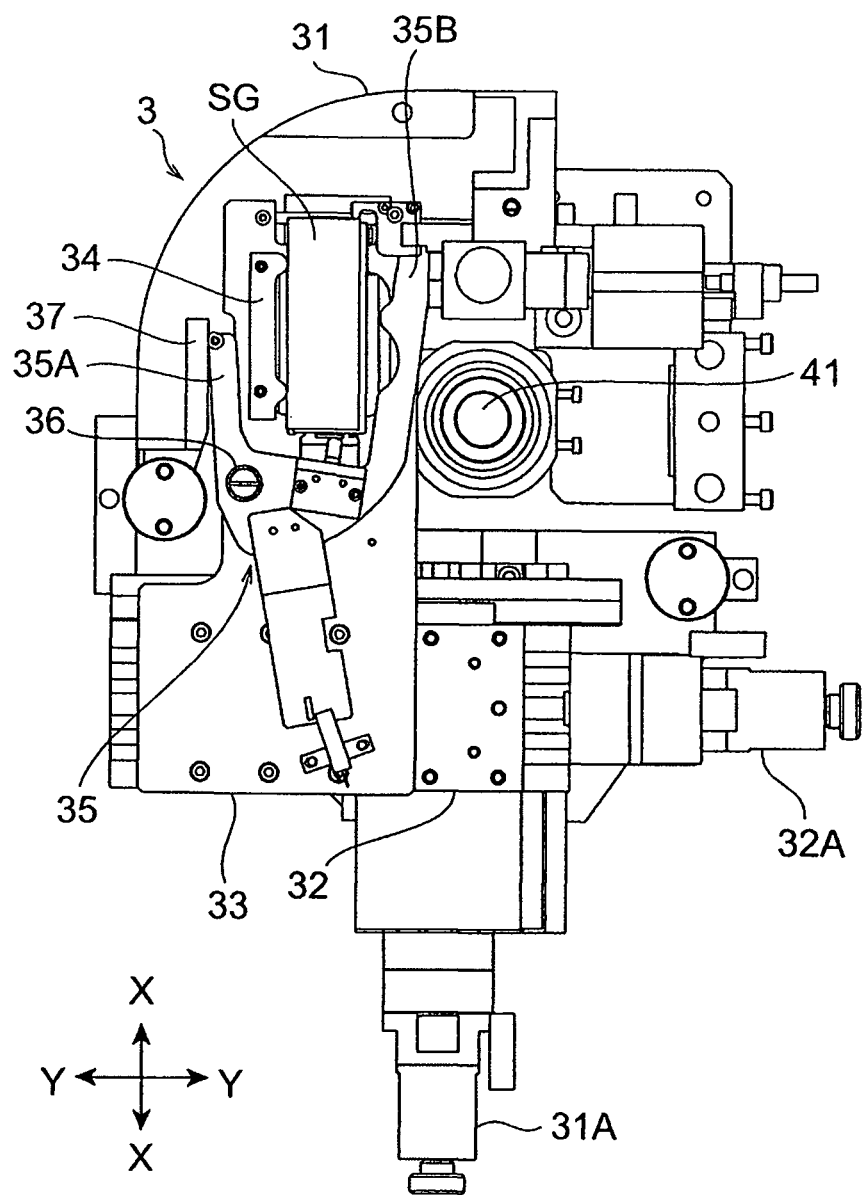
FIG. 5 is a plan view of a slide glass setting unit, shown in FIG. 1, at a macro observation position.
Figure 6:
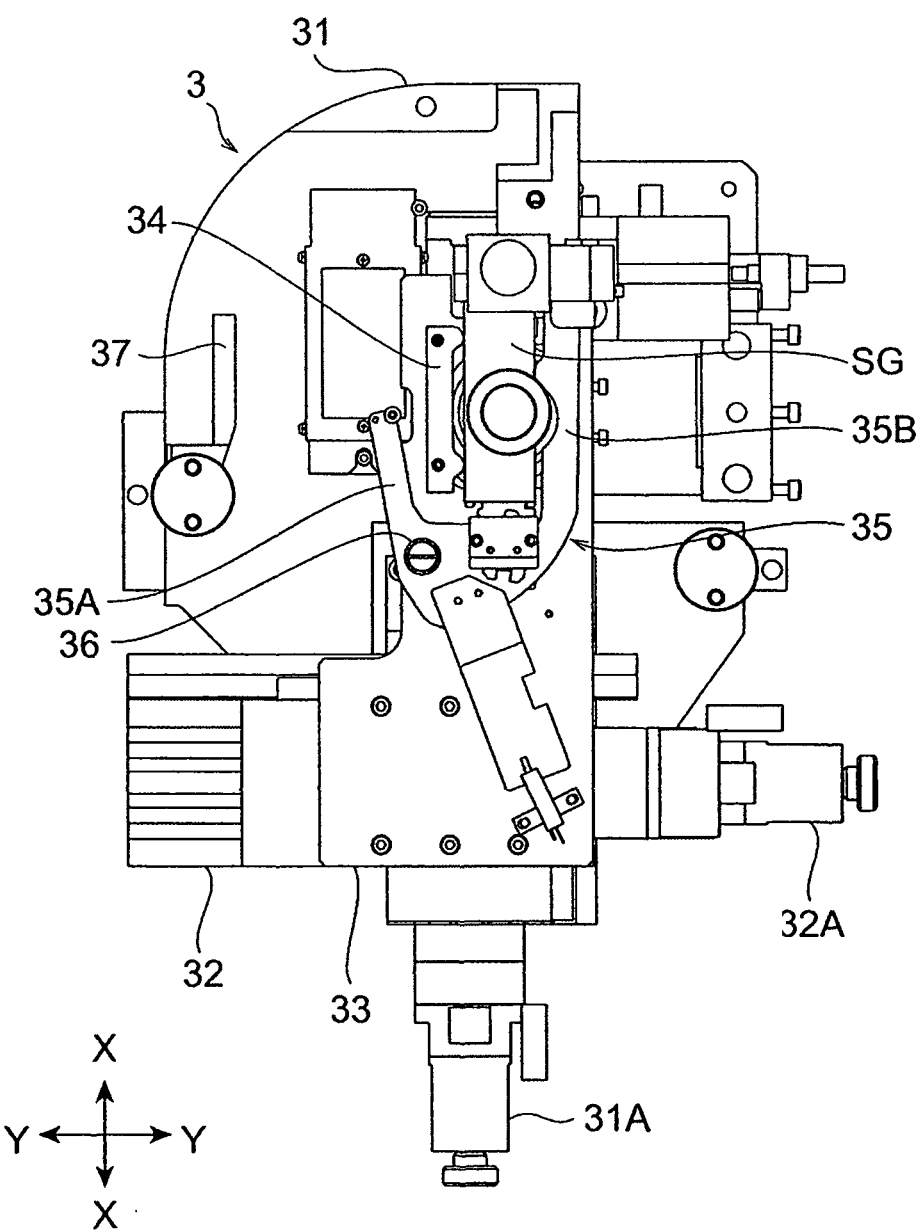
FIG. 6 is a plan view of the slide glass setting unit, shown in FIG. 1, at a scan position.

Here, as shown in FIGS. 5 and 6, the slide glass setting unit 3 has a stepping stage 32 and a scanning stage 33. The stepping stage 32 is position controlled in the X-axis directions via a ball screw mechanism by a stepping motor 31A installed on a base stage 31. The scanning stage 33 is position controlled in the Y-axis directions via a ball screw mechanism by a stepping motor 32A installed on the stepping stage 32. The scanning stage 33 functions as a sample setting stage.

In the scanning stage 33 that functions as the sample setting stage is formed a notch that enables passage of the draw-out handle 23A (see FIG. 4) of the slide glass conveying unit 2 with a slide glass SG set thereon. A sample setting surface, on which the slide glass SG is set, is arranged by respective sides of the notch supporting left and right edges of the slide glass SG, which is wider than the draw-out handle 23A.

The scanning stage 33 is fixed with a positioning block 34 that receives, for example, a left edge of the slide glass SG that has been set on the sample setting surface by the draw-out handle 23A. Also, on the scanning stage 33, a slide glass presser arm 35, which presses, for example, a right edge of the slide glass SG toward the positioning block 34 and thereby holds the slide glass SG at a predetermined position, is supported in a rotatable manner via a pin 36.

The slide glass presser arm 35 is constituted by a passive portion 35A, extending toward the left side of the slide glass SG, and a pressing portion 35B, extending toward the right side of the slide glass SG, and has a U-like planar shape. The slide glass presser arm 35 is also urged by a spring so as to rotate in a counterclockwise direction about the pin 36.

In the slide glass presser arm 35, when the scanning stage 33 moves to a macro observation position at a left end as shown in FIG. 5, the passive portion 35A contacts a contacting plate 37, which is an immobile member at the base stage 31 side, and thus rotates in a clockwise direction about a pin. In this process, the pressing portion 35B separates from the right edge of the slide glass SG.

Furthermore, in the slide glass presser arm 35, when the scanning stage 33 moves to a scan position at a right end as shown in FIG. 6, the passive portion 35A separates from the contacting plate 37 and thus rotates in a counterclockwise direction about the pin. In this process, the pressing portion 35B presses the right edge of the slide glass SG against the positioning block 34 and functions to hold the slide glass SG at a predetermined position.

Figure 7:
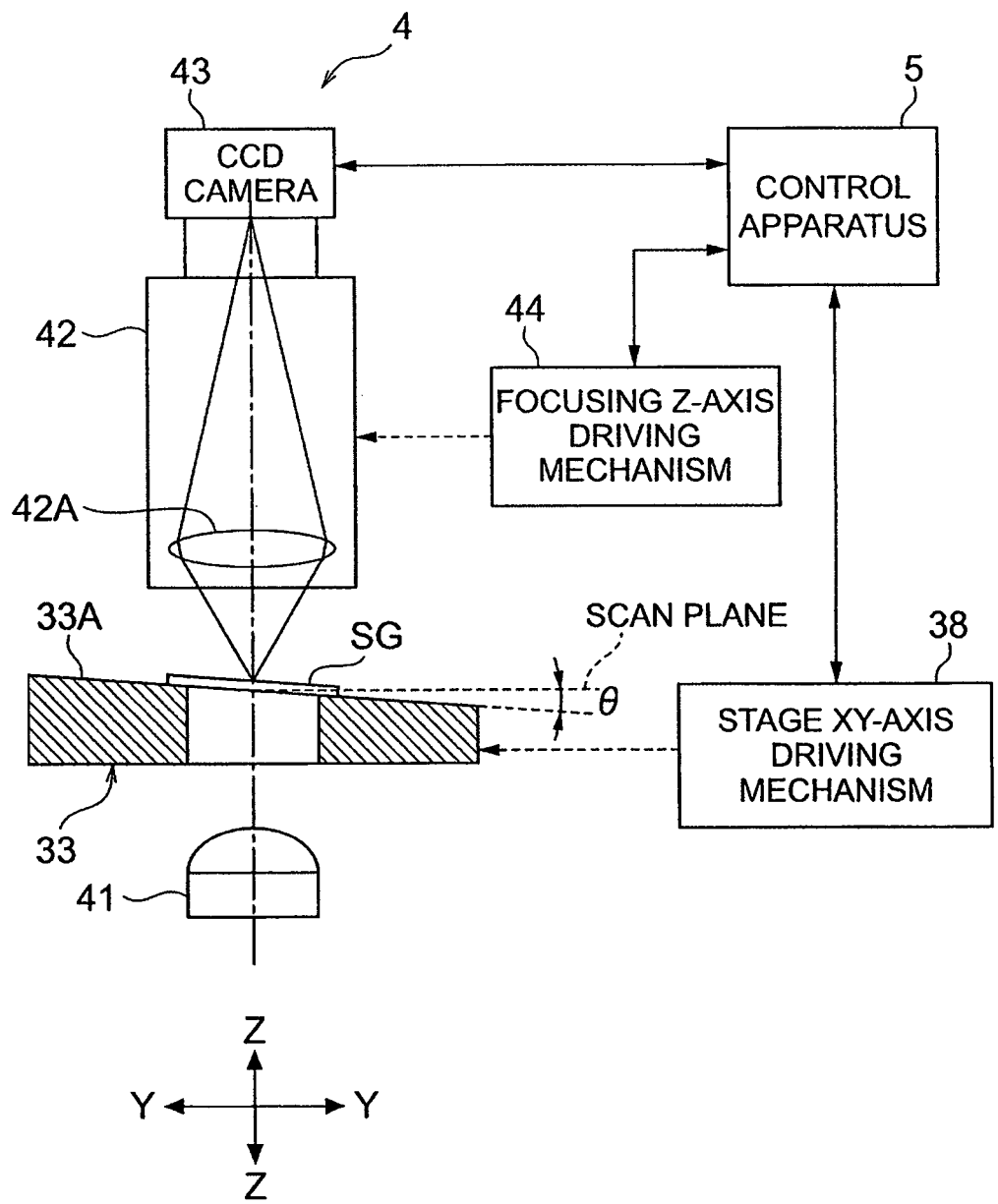
FIG. 7 is a schematic view of an arrangement of a slide glass imaging unit shown in FIG. 1.

The slide glass imaging unit 4 shown in FIG. 1, as schematically shown in FIG. 7, has a scan light source 41, an optical system 42, a CCD camera 43, which is an imaging unit, a stage XY-axis driving mechanism 38 (first driving mechanism), a focusing Z-axis driving mechanism (second driving mechanism), and a control apparatus 5 (control unit). The scan light source 41 illuminates imaging light from below onto the slide glass SG, set on the sample setting surface 33A of the scanning stage 33 (see FIG. 6). The optical system 42 includes an objective lens 42A onto which imaging light that has been transmitted through the slide glass SG is made incident. The CCD camera 43 receives the imaging light via the optical system 42. The stage XY-axis driving mechanism 38 moves the scanning stage 33 along a scan plane orthogonal to an optical axis of the objective lens 42A. The focusing Z-axis driving mechanism 44 performs position control of the CCD camera 43 and the objective lens 42A of the optical system 42 in an optical axis direction along the Z-axis and thereby adjusts a focal point position of the CCD camera 43 with respect to the slide glass SG.

The CCD camera 43 is enabled to perform an operation of taking in a two-dimensional image. The focusing Z-axis driving mechanism 44 has a highly versatile arrangement that combines a stepping motor with a ball screw mechanism. The control apparatus 5 controls the CCD camera 43 and the focusing Z-axis driving mechanism 44 along with the stage XY-axis driving mechanism 38, which includes stepping motors 31A, 32A, and so on, that drive the scanning stage 33 (see FIG. 6) in the X-axis directions and the Y-axis directions.

The control apparatus 5 is constituted by using, for example, personal computer hardware and software and includes an input/output interface, an A/D converter, a ROM (read-only memory), storing programs and data, a RAM (random access memory), temporarily storing input data, and so on, a CPU (central processing unit), executing programs, and so on, as the hardware.

The control apparatus 5 controls the stage XY-axis driving mechanism 38 to move the scanning stage 33, on which the slide glass SG has been set, in a scan direction along the Y-axis and a stepping direction along the X-axis. In this process, the control apparatus 5 performs position control of the objective lens 42A in the optical axis direction along the Z-axis so that the focal point of the CCD camera 43 is successively set on respective imaging positions set inside an imaging object area that includes the sample sealed in the slide glass SG (fine adjustment of the focal point position of the CCD camera 43). The control apparatus 5 then controls the CCD camera 43 to successively take in localized microscopic images of the sample surface via the objective lens 42A.

Here, because the focusing Z-axis driving mechanism 44 has the structure that combines the stepping motor with the ball screw mechanism, when the drive direction is inverted, lost motion occurs due to errors in forward and reverse rotation of the motor, gear backlash, torsional rigidity of the ball screw mechanism, and so on. As a result, it is predicted that the objective lens 42A cannot be kept track of in real time in optical axis directions along the Z-axis, making it difficult to set the focal point of the CCD camera 43 successively on respective portions (portions at which an imageable area of the CCD camera 43 is positioned) of the sample sealed in the slide glass SG.

Such circumstances must thus be avoided to enable the focal point of the objective lens 42A to be set successively on respective portions (imaging positions in the imaging object area) of the sample. Thus, in the present embodiment, the sample setting surface 33A of the scanning stage 33 is inclined by just a predetermined inclination angle θ with respect to the scan plane orthogonal to the optical axis of the objective lens 42A. The inclination of the sample setting surface 33A is set so as to be greater than the inclination of the surface of the slide glass SG in which the sample is sealed.

Figure 8:
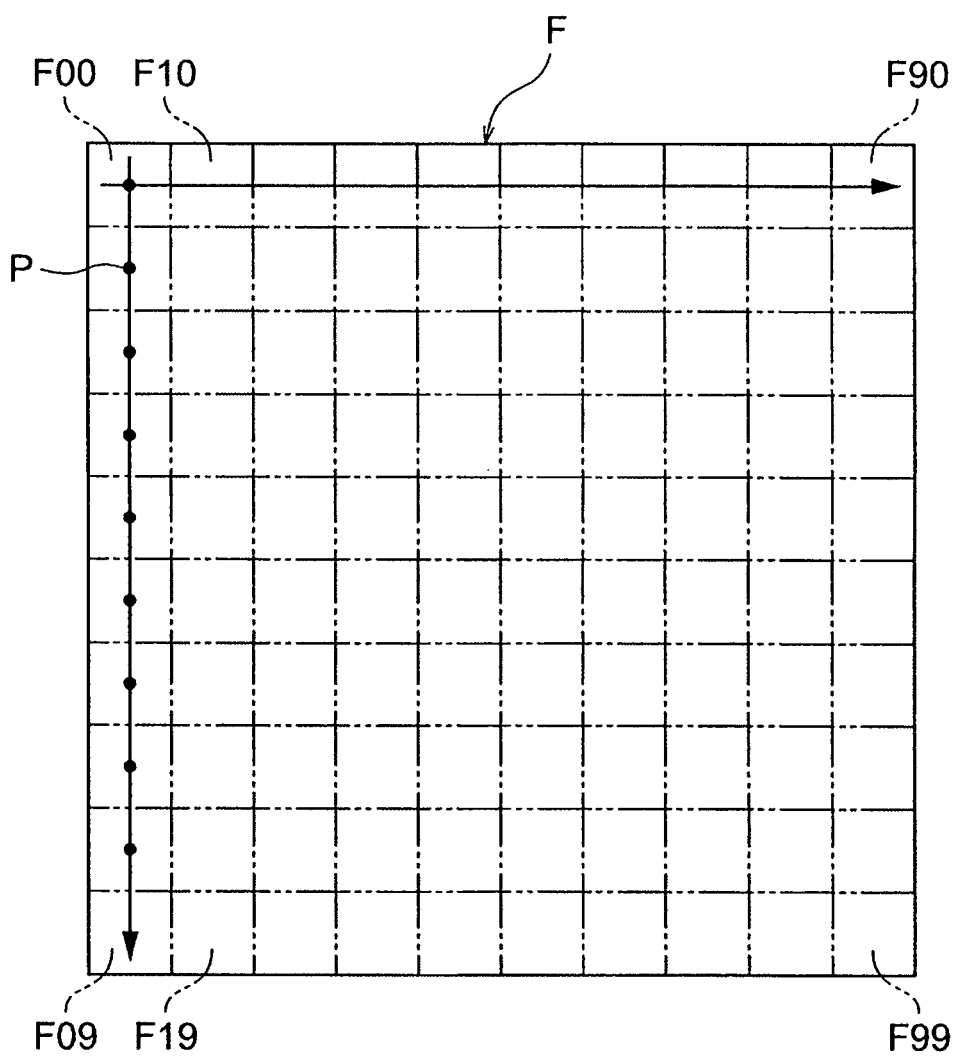
FIG. 8 is a schematic view of a first example of partitioning of an imaging object area of a sample inside a slide glass, shown in FIG. 7, into a plurality of imaging units, each of a size substantially equal to an imageable area of the imaging unit.

FIG. 8 shows a first example, in which an imaging object area F that includes the sample is defined as a square with each side being 25 mm and the imaging object area F is partitioned vertically and laterally into 10×10 lattice cells so that the imaging object area F is constituted of square imaging units F00 to F99, each having sides of 2.5 mm. In the figure, the vertical direction of the solid line arrow directed from the imaging unit F00 to the imaging unit F09 is the scan direction, and the lateral direction of the solid line arrow directed from the imaging unit F00 to the imaging unit F90 is the stepping direction. Also, in the example of FIG. 8, the size of the imageable area of the CCD camera 43 is substantially the same as each imaging unit, and thus the position of a central point P of each imaging unit is the focal point position of the CCD camera 43 with respect to the imaging unit. Also, in the present Description, because the image of the imageable area that is formed via the optical system 42 on the CCD camera 4 is defined as the localized microscopic image, each localized microscopic image that is obtained is a single imaging unit in the first example of FIG. 8.

Here, in a case where the sample is a pathological tissue sample, a maximum inclination, which joins a high point and a low point of the imaging object area F within a length of 25 mm in the scan direction along a single column from the imaging unit F00 to the imaging unit F09, is normally approximately 10 to 20 μm/25 mm. Thus, in the present embodiment, the magnitude of the inclination of the sample setting surface 33A is set, for example, to 50 μm/25 mm (200 μm/100 mm), which is within the range of 25 to 50 μm/25 mm (=1 to 2 μm/mm). The inclination of the sample setting surface 33A is set so that the surface is inclined along the scan direction, that is for example, so that a scan starting position is high and an ending position is low.

An operation of the microscopic image capturing apparatus arranged as described above shall now be described. For the slide glass SG that is set on the inclined sample setting surface 33A of the scanning stage 33 shown in FIG. 7, the microscopic image capturing apparatus successively captures localized microscopic images of the respective imaging units to F99 in the imaging object area F (see FIG. 8) that includes the sample sealed in the slide glass SG.

First, the control apparatus 5 acquires focal point position data of the respective central points P of the imaging units F00 to F99 shown in FIG. 8 and stores these in the form of a focus map.

In preparing the focus map, the control apparatus 5 outputs a control signal to the stage XY-axis driving mechanism 38 to make the scanning stage 33 move successively in the scan direction and the stepping direction so that the imaging position of the CCD camera 43 successively matches the respective imaging units F00 to F99 shown in FIG. 8. That is, the scanning stage 33 moves so that each of the imaging units F00 to F99 becomes positioned immediately below the objective lens 42A in order.

In the meantime, the control apparatus 5 acquires focal point data of the CCD camera 43 at each central point P of each of the imaging units F00 to F99 that becomes positioned immediately below the objective lens 42A. That is, the control apparatus 5 outputs a control signal to the focusing Z-axis driving mechanism 44 to make the objective lens 42A move continuously along the Z-axis (optical axis direction of the objective lens 42A) above and below the focal point position of the CCD camera 43. At the same time, the control apparatus 5 outputs a control signal to the CCD camera 43 to make the CCD camera 43 capture a plurality of microscopic images that differ in focal point position.

The control apparatus 5 then comparatively evaluates the contrast, brightness, and other image characteristics of the plurality of microscopic images that differ in focal point position, acquires the focal point positions at which clear images are obtained as focal point data of the CCD camera 43 at the respective central points P of the imaging units F00 to F99, and thereby prepares the focus map of the imaging units F00 to F99.

After preparing the focus map of the imaging units F00 to F99, the control apparatus 5 outputs a control signal to the stage XY-axis driving mechanism 38 to make the scanning stage 33 move as shown in FIG. 8 so that the respective imaging units F00 to F99 successively coincide with the imageable area of the CCD camera 43 (makes the scanning stage 33 move in the scan direction and the stepping direction shown in FIG. 8 so that the objective lens 42A becomes positioned immediately above each of the imaging units F00 to F99). In the meantime, the control apparatus 5 outputs a control signal to the focusing Z-axis driving mechanism 44 to make the objective lens 42A move in the Z-axis direction and be set at each focal point position of the CCD camera 43 stored in the focus map. The control apparatus 5 then outputs a control signal to the CCD camera 43 at each predetermined focal position and makes the CCD camera 43 capture a localized microscopic image of each of the imaging units F00 to F99.

Figure 9:
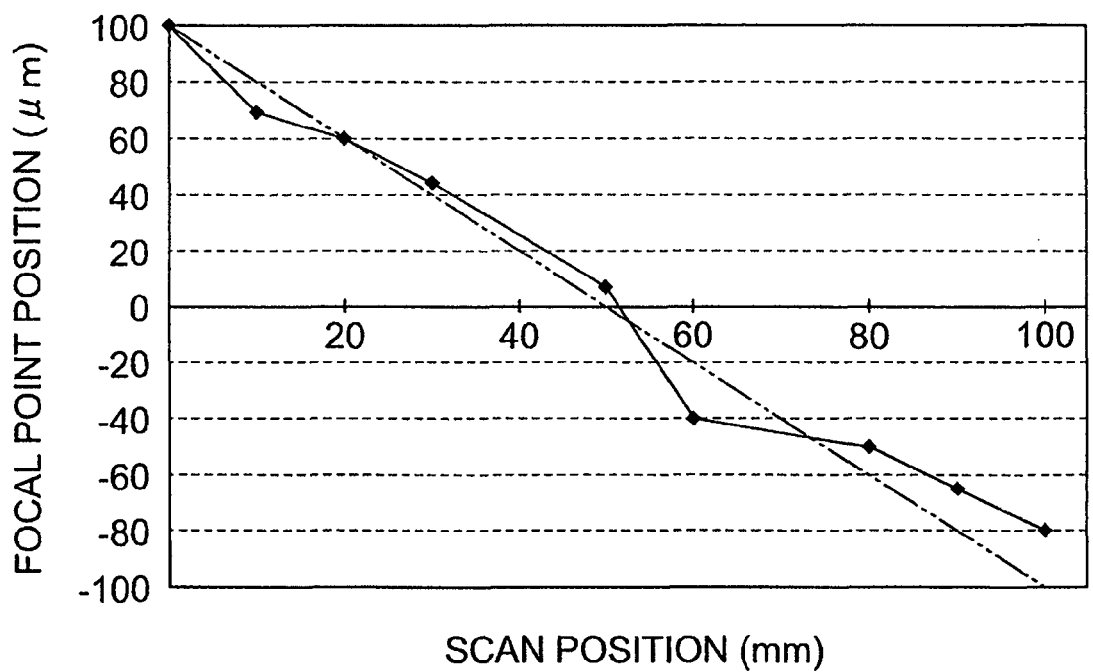
FIG. 9 is a graph that shows, along a scan direction shown in FIG. 8, positions of a focal point of the imaging unit with respect to imaging units aligned along a single column on a sample setting surface that is inclined as shown in FIG. 7.

Here, FIG. 9 is a graph, in which focal point positions, stored as data in the focus map, are joined along the scan direction in an arbitrary column of the imaging object area F. In the figure, the inclined line indicated by the alternate long and two short dashes line indicates the sample setting surface 33A (reference surface) with an inclination, for example, of 50 μm/25 mm (200 μm/100 mm) as described above.

As shown in FIG. 9, the focal point positions of the CCD camera 43 along the scan direction in the arbitrary column decrease successively in a step-like manner from plus 100 μm to minus 100 μm. This indicates that the direction in which the focusing Z-axis driving mechanism 44 finely adjusts the objective lens 42A along the optical axis, that is, the Z-axis to set the focal point of the CCD camera 43 on the center P of each imaging unit is restricted to just the negative direction.

Thus, in accordance with the microscopic image capturing apparatus according to the present embodiment, despite having the focusing Z-axis driving mechanism 44 with the structure combining the stepping motor with the ball screw mechanism, lost motion does not occur in the focusing Z-axis driving mechanism 44. As a result, the focal point of the CCD camera 43 can be set accurately on the portion of the sample that is matched with the imageable area via the objective lens 42A.

Figure 10:
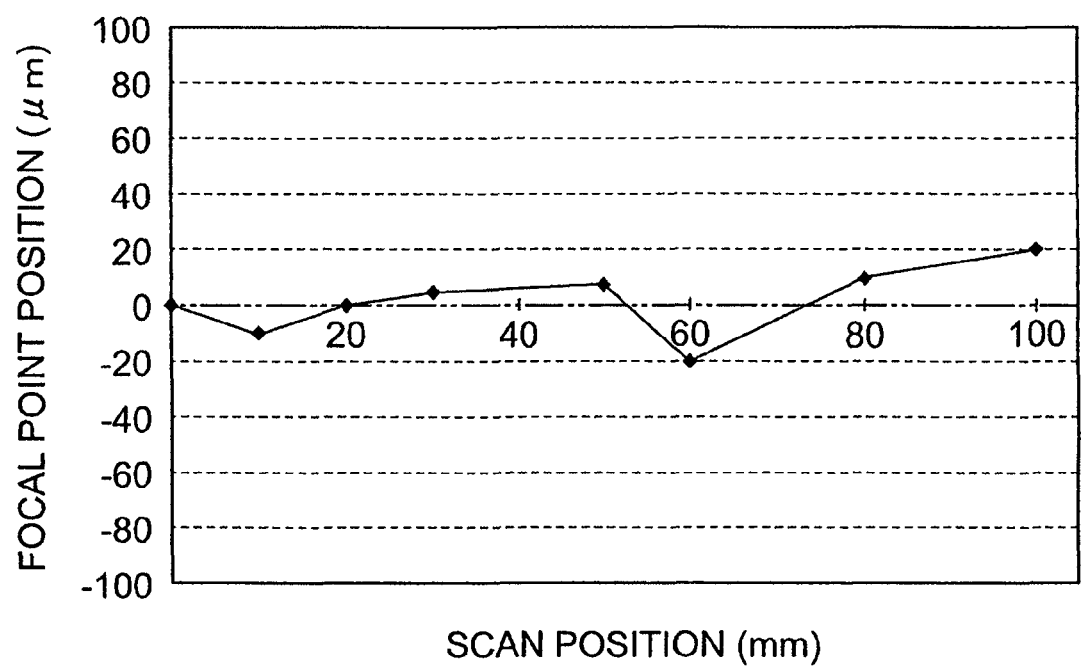
FIG. 10 is a graph that shows, along the scan direction shown in FIG. 8, positions of the focal point of the imaging unit with respect to imaging units aligned along a single column on a horizontal sample setting surface as a comparative example.

On the other hand, FIG. 10 shows, as a comparative example, a graph, in which focal point positions of an imaging unit with respect to localized regions aligned along a single column on a horizontal sample setting surface are joined along the scan direction shown in FIG. 8. In the graph shown in FIG. 10, the focal point positions of the respective imaging units along the scan direction in an arbitrary column increase and decrease in sawtooth-like manner from plus 20 μm to minus 20 μm. This indicates that the direction in which the focusing Z-axis driving mechanism 44 finely adjusts the objective lens 42A along the Z-axis (along the optical axis of the objective lens 42A) to set the focal point of the CCD camera 43 on the center P of each imaging unit changes from the positive direction to the negative direction and from the negative direction to the positive direction. In this case, lost motion occurs in the focusing Z-axis driving mechanism 44, and as a result, the focal point of the CCD camera 43 cannot be set accurately on each portion of the sample captured by the objective lens 42A or to be more specific, on the center P of each imaging unit.

The microscopic image capturing apparatus according to the present invention is not restricted to the above-described embodiment. For example, the focusing Z-axis driving mechanism 44 shown in FIG. 7 may perform position control of the scanning stage 33 in a Z-axis direction that coincides with a direction of the optical axis of the objective lens 42A. Also, in place of providing the scanning stage 33, the optical system 42 and the CCD camera 43 may be provided with an XY-axis driving mechanism or an XYZ-axis driving system.

Figure 11:
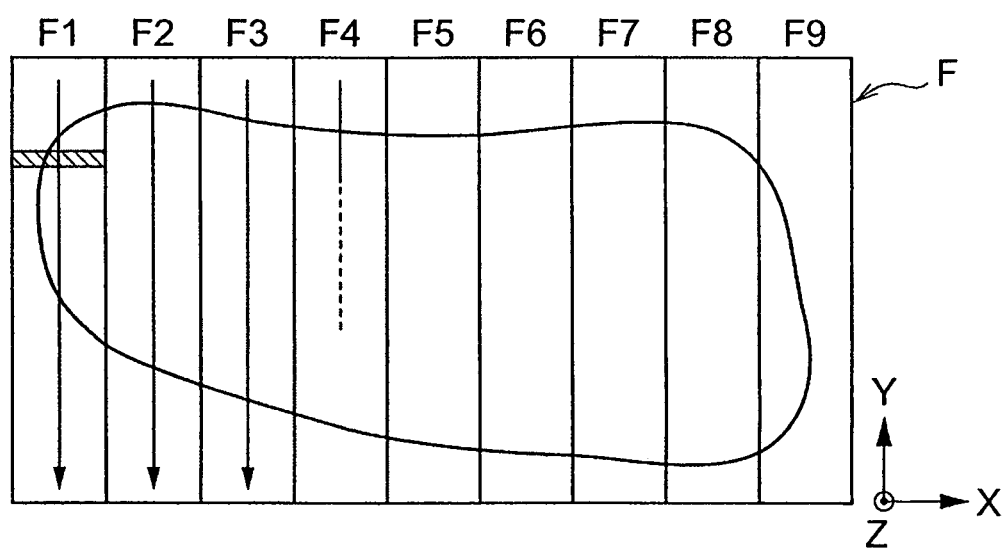
FIG. 11 is a schematic view of a second example of partitioning of the imaging object area of the sample inside the slide glass, shown in FIG. 7, into a plurality of imaging units, each of a size larger than the imageable area of the imaging unit.

The CCD camera 43 shown in FIG. 7 may be a one-dimensional CCD camera that performs an operation of taking in a one-dimensional image. For example, a general line sensor or a TDI sensor, and so on, may be applied. The microscopic image capturing operation by a one-dimensional CCD camera or other one-dimensional imaging unit is performed as follows. FIG. 11 is a schematic view of a second example, in which the imaging object area that includes the entire sample inside the slide glass, shown in FIG. 7, is partitioned into a plurality of imaging units, each of a size larger than the imageable area of the imaging unit.

As shown in FIG. 11, the imaging object area F is partitioned into a plurality of strip-like imaging units F1 to F9. An imageable area of a one-dimensional CCD camera is a region, indicated by slanted lines in the imaging unit F1 in FIG. 11 and having the X-axis direction as a longitudinal direction. By the imageable area being scanned in a scan direction (negative direction along the Y-axis) on the scanning stage 43, on which a sample is set, an image of the imaging unit F1 (an image with a strip-like shape), in which a plurality of localized microscopic images of the imageable area that are formed and acquired successively are aligned along the Y-axis direction, is obtained. The strip-like image of the imaging unit F1 thus becomes a single imaging unit in the second example of FIG. 11. Furthermore, as shown in FIG. 11, by the scanning of the imageable area, performed in the imaging unit F1, being repeated upon performing stepping in the longitudinal direction of the imaging object area F (the positive X-axis direction), strip-like images of the imaging units F1 to F9 are respectively obtained. By synthesizing the thus obtained strip-like images of the imaging units F1 to F9 in a state of being aligned in the X-axis direction, an overall image of the sample (a microscopic image of the entire imaging object area F) is formed.

In addition, although the embodiment described above is described as an example of the scanning stage 33, having the sample setting surface 33A that is inclined with the scan plane orthogonal to the optical axis of the objective lens 42A, the present invention is not restricted thereto and, for example, a commercially available scanning stage may be fixed so that the sample setting surface thereof is inclined with respect to the scan plane. Or, an inclining stage or a tilt stage, with which the inclination angle can be varied, may be applied. In a case where a stage with which the inclination angle can be varied is applied, the inclination angle of the sample setting surface with respect to the scan plane is preferably set based on a focus map prepared for a sample set in a state in which the sample setting surface is not inclined.

Figure 12:
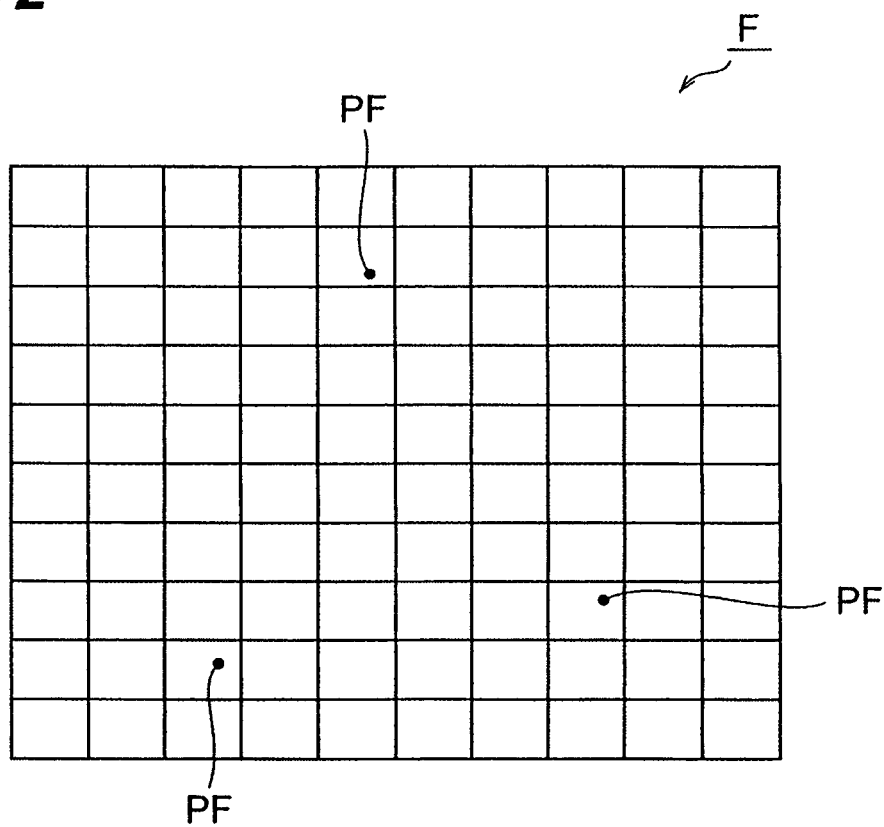
FIG. 12 is a diagram for describing another method for determining the focal point position in the imaging object area.

Furthermore, in regard to the preparation of the focus map, although the focal point position data at the respective central points P of the imaging units F00 to F99 are acquired in FIG. 8, the present invention is not restricted thereto. FIG. 12 is a diagram for describing another method for acquiring focal point information for the entire imaging object area F of a sample. In the focal point information acquisition method shown in FIG. 12, three focal point measuring positions PF are set for the imaging object area F. By focal point measurement being performed by the above-described method for each of the three focal point measuring positions PF, in-focus point positions are determined. From the in-focus point positions determined based on the three focal point measuring positions PF, an in-focus point position of an arbitrary position inside the imaging object area F is determined by linear interpolation. The in-focus point positions and other focal point information of respective portions of the imaging object area F can be acquired efficiently by such a method. Also, by setting four or more focal point measuring positions PF in the imaging object area F and determining the in-focus point position of an arbitrary position inside the imaging object area F by a least squares method, a more precise focal point position control is enabled.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

Industrial Applicability

The microscopic image capturing apparatus according to the present invention can be applied to an inspection apparatus for cell analysis, and so on.

The invention claimed is:

1. A microscopic image capturing apparatus, comprising:
a sample setting stage having a sample setting surface on which a sample can be set;
an imaging unit, arranged so as to oppose the sample setting surface, successively imaging respective portions in an imaging object area on said sample setting surface;
an objective lens, arranged between said imaging unit and said sample setting surface, forming, on said imaging unit, a localized microscopic image of an area, within the imaging object area, that is imageable by said imaging unit;
a first driving mechanism adjusting relative positions of said sample setting stage and said objective lens, by moving said sample setting stage along a scan plane orthogonal to an optical axis of said objective lens;
a second driving mechanism adjusting relative positions of said sample setting stage and said objective lens, by moving said objective lens along an optical axis direction of said objective lens; and
a control unit, by controlling said first and second driving mechanisms, relatively moving the imageable area of said imaging unit along a predetermined scan direction while adjusting the focal point position of said imaging unit in the imaging object area,
wherein, in the condition that said sample setting surface of said sample setting stage is inclined with respect to the scan plane, said control unit:
determines a plurality of focal point measuring positions within the imaging object area;
forms a focus map on the basis of in-focus point positions of the determined focal point measuring positions; and
moves said objective lens along the optical axis direction of said objective lens by said second driving mechanism on the basis of said formed focus map, while the imageable area of said imaging unit relatively moves along the predetermined scan direction in the imaging object area.

2. A microscopic image capturing apparatus according to claim 1, wherein said control unit controls said first driving mechanism such that the focal point position of said imaging unit is monotonously adjusted in only one direction along the optical axis of said objective lens while the imageable area of said imaging unit is being relatively moved in the predetermined scan direction within the imaging object area.

3. A microscopic image capturing apparatus according to claim 1, wherein said sample setting surface of said sample setting stage has an inclination such that a straight line on said sample setting surface that intersects the optical axis of said objective lens intersects the scan plane at a predetermined angle.

4. A microscopic image capturing apparatus according to claim 1, wherein said sample setting surface of said sample setting stage has an inclination of 1 to 2 μm/mm along the predetermined scan direction.

5. A microscopic image capturing apparatus according to claim 1, wherein said sample setting surface of said sample setting stage has an inclination such that, when a sample is set on said sample setting surface, a surface of the sample that opposes said imaging unit across said objective lens is inclined with respect to the scan plane.

6. A microscopic image capturing method using a microscopic image capturing apparatus according to claim 1.

7. A microscopic image capturing method according to claim 6, wherein, prior to the imaging scan, the sample is set on said sample setting surface of said sample setting stage such that, with respect to the scan plane, an inclination of a surface of said sample becomes smaller than an inclination of said sample setting surface.

8. A microscopic image capturing apparatus according to claim 1, wherein each of the focal point measuring positions is determined every each of imaging units constituting the imaging object area.

* * * * *

UNITED STATES PATENT AND TRADEMARK OFFICE
CERTIFICATE OF CORRECTION

PATENT NO. : 8,422,127 B2  Page 1 of 1
APPLICATION NO. : 11/886255
DATED : April 16, 2013
INVENTOR(S) : Uchiyama et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1274 days.

Signed and Sealed this
Eighth Day of September, 2015

Michelle K. Lee
*Director of the United States Patent and Trademark Office*